(12) United States Patent
Fang

(10) Patent No.: US 7,949,778 B2
(45) Date of Patent: May 24, 2011

(54) SYSTEMS, METHODS, APPARATUS AND COMPUTER PROGRAM PRODUCTS FOR PROVIDING PACKET-LEVEL FEC WITH HIGHER THROUGHPUT USING USER DATAGRAM PROTOCOL (UDP)

(75) Inventor: Weimin Fang, Stamford, CT (US)

(73) Assignee: Kencast, Inc., Stamford, CT (US)

( * ) Notice: Subject to any disclaimer, the term of this patent is extended or adjusted under 35 U.S.C. 154(b) by 505 days.

(21) Appl. No.: 12/055,553

(22) Filed: Mar. 26, 2008

(65) Prior Publication Data

US 2008/0244001 A1 Oct. 2, 2008

Related U.S. Application Data

(60) Provisional application No. 60/908,392, filed on Mar. 27, 2007.

(51) Int. Cl.
G06F 15/16 (2006.01)
(52) U.S. Cl. .......................... 709/232; 709/233
(58) Field of Classification Search .................. None
See application file for complete search history.

(56) References Cited

U.S. PATENT DOCUMENTS

| | | |
|---|---|---|
| 4,718,066 A | 1/1988 | Rogard |
| 4,907,277 A | 3/1990 | Callens et al. |
| 5,485,474 A | 1/1996 | Rabin |
| 5,594,490 A | 1/1997 | Dawson et al. |
| 5,600,663 A | 2/1997 | Ayanoglu et al. |
| 5,617,541 A | 4/1997 | Albanese et al. |
| 5,631,907 A | 5/1997 | Guarneri et al. |
| 5,768,533 A | 6/1998 | Ran |
| 5,790,524 A | 8/1998 | Bennett et al. |
| 5,815,514 A | 9/1998 | Gray |
| 5,903,574 A | 5/1999 | Lyons |
| 5,959,974 A | 9/1999 | Badt et al. |
| 6,012,159 A | 1/2000 | Fischer et al. ................. 714/755 |
| 6,031,818 A | 2/2000 | Lo |
| 6,052,819 A | 4/2000 | Barker et al. |
| 6,104,757 A | 8/2000 | Rhee |
| 6,141,788 A | 10/2000 | Rosenberg et al. |
| 6,151,696 A | 11/2000 | Miller et al. |
| 6,189,039 B1 | 2/2001 | Harvey et al. |
| 6,249,810 B1 | 6/2001 | Kiraly |
| 6,272,658 B1 | 8/2001 | Steele et al. ................... 714/752 |
| 6,289,054 B1 | 9/2001 | Rhee |
| 6,307,487 B1 | 10/2001 | Luby |
| 6,317,462 B1 | 11/2001 | Boyce |
| 6,320,520 B1 | 11/2001 | Luby |

(Continued)

OTHER PUBLICATIONS

Asmuth et al., "Proceedings of the 1982 Symposium on Security and Privacy," IEEE Computer Society, Apr. 25-26, 1982, p. 156-169, Oakland CA.

(Continued)

*Primary Examiner* — Bunjob Jaroenchonwanit
(74) *Attorney, Agent, or Firm* — Fitzpatrick, Cella, Harper & Scinto

(57) ABSTRACT

A method and system for data delivery from a server to a client is provided. The server maintains a session counter and transmits data to a client at a transmission speed. The server receives a message from the client indicating a percentage of packets lost in a current session and compares the percentage of packets lost to a predefined range of packet loss, and modifies the transmission speed based on the comparison. Forward Error Correction (FEC) may be used to reconstruct the lost packets.

19 Claims, 3 Drawing Sheets

U.S. PATENT DOCUMENTS

| | | | |
|---|---|---|---|
| 6,336,200 B1 | 1/2002 | Wolfgang | 714/752 |
| 6,373,406 B2 | 4/2002 | Luby | |
| 6,411,223 B1 | 6/2002 | Haken et al. | |
| 6,445,717 B1 | 9/2002 | Gibson et al. | |
| 6,486,803 B1 | 11/2002 | Luby et al. | |
| 6,526,022 B1 | 2/2003 | Chiu et al. | |
| 6,567,929 B1 | 5/2003 | Bhagavath et al. | |
| 6,567,948 B2 | 5/2003 | Steele et al. | |
| 6,570,843 B1 | 5/2003 | Wolfgang | 370/216 |
| 6,574,795 B1 | 6/2003 | Carr | |
| 6,594,798 B1 | 7/2003 | Chou et al. | |
| 6,606,723 B2 | 8/2003 | Wolfgang | |
| 6,609,223 B1 | 8/2003 | Wolfgang | 714/752 |
| 6,614,366 B2 | 9/2003 | Luby | |
| 6,671,807 B1 | 12/2003 | Jaisimha et al. | |
| 6,693,907 B1* | 2/2004 | Wesley et al. | 370/390 |
| 6,701,373 B1 | 3/2004 | Sakazawa et al. | |
| 6,735,634 B1 | 5/2004 | Geagan, III et al. | |
| 6,765,889 B1 | 7/2004 | Ludwig | |
| 6,782,490 B2 | 8/2004 | Maxemchuk et al. | |
| 6,804,244 B1 | 10/2004 | Anandakumar et al. | |
| 7,024,609 B2 | 4/2006 | Wolfgang et al. | 714/748 |
| 2002/0097678 A1* | 7/2002 | Bisher et al. | 370/232 |
| 2003/0009718 A1 | 1/2003 | Wolfgang et al. | |
| 2003/0012138 A1* | 1/2003 | Abdelilah et al. | 370/231 |
| 2003/0079028 A1* | 4/2003 | Kortum et al. | 709/229 |
| 2004/0025186 A1* | 2/2004 | Jennings et al. | 725/93 |
| 2005/0039103 A1* | 2/2005 | Azenko et al. | 714/776 |
| 2006/0029016 A1* | 2/2006 | Peles | 370/328 |
| 2006/0029037 A1* | 2/2006 | Chen et al. | 370/351 |
| 2006/0064626 A1 | 3/2006 | Fischer et al. | 714/776 |
| 2008/0098284 A1 | 4/2008 | Wolfgang et al. | |
| 2008/0117819 A1* | 5/2008 | Flott et al. | 370/232 |
| 2008/0298271 A1* | 12/2008 | Morinaga et al. | 370/252 |
| 2010/0005178 A1* | 1/2010 | Sindelaru et al. | 709/228 |

OTHER PUBLICATIONS

Karnin et al., "On Secret Sharing Systems," IEEE Transactions on Information Theory, Jan. 1983, vol. IT-29, No. 1.

MacKay, David J.C., "Information Theory, Inference, and Learning Algorithms," Cambridge University Press, 2003.

McAuley, Anthony J, "Reliable Broadband Communication Using a Burst Erasure Correcting Code," SIGCOMM '90 Symposium, Sep. 1990, p. 297-306.

McEliece et al., "On Sharing Secrets and Reed-Solomon Codes," Communications of the ACM, Sep. 1981, vol. 24.

Miller, C Kenneth, "Reliable Multicast Protocols: A Practical View", Local Computer Networks Conference Proceedings, Nov. 1997, p. 369-378.

Rabin, Michael O, "Efficient Dispersal of Information for Security, Load Balancing, and Fault Tolerance," Journal of the Assoc. For Computing Machinery, Apr. 1998, p. 335-348, vol. 36, No. 2.

Rabin, Michael O, "Probabilistic Algorithms in Finite Fields," SIAM J. Comput., May 1980, p. 273-280, vol. 9, No. 2.

Shamir, Adi, "How to Share a Secret," Communications of the ACM, Nov. 1979, p. 612-613, vol. 22, No. 11.

* cited by examiner

SYSTEMS, METHODS, APPARATUS AND COMPUTER PROGRAM PRODUCTS FOR PROVIDING PACKET-LEVEL FEC WITH HIGHER THROUGHPUT USING USER DATAGRAM PROTOCOL (UDP)

CROSS-REFERENCE TO RELATED APPLICATION

This application claims benefit of U.S. Provisional Application No. 60/908,392 filed on Mar. 27, 2007, the entire disclosure of which is incorporated by reference.

BACKGROUND OF THE INVENTION

1. Field of the Invention

Example aspects of the present invention generally relate to data communications and, more particularly, to systems, methods, apparatus and computer program products for providing packet-level forward error correction (FEC) with higher throughput using UDP ("User Datagram Protocol").

2. Related Art

"Evolution Data Optimized" or "EV-DO" is a wireless radio broadband data standard adopted by many CDMA mobile phone service providers in countries such as the United States, Canada, Mexico, Europe, Asia, Russia, Brazil, and Australia. It is standardized by the 3d Generation Partnership Project 2 ("3GPP2"), as part of the CDMA2000 family of standards. One aspect of these standards involves the use of UDP and/or Transmission Control Protocol ("TCP") operating on top of Internet Protocol ("IP").

Conventional data (e.g., content) delivery using one-way UDP on an EV-DO network allows for higher data transmission speeds than conventional two-way data delivery using TCP. However, UDP is typically not as reliable for downloading files as TCP. Unlike UDP, TCP uses a return link to acknowledge successful data receipt and if no acknowledgement is received it is assumed that a packet has been lost and the protocol causes that data packet to be resent.

UDP also does not efficiently use a network, such as an EV-DO network or the Internet, because when sending data, UDP does not monitor the available network bandwidth. In addition, network bandwidth availability may vary continuously. Therefore, the UDP transmitter is typically configured to deliver data on a network slowly enough so that it is not lost during periods of low bandwidth availability. Consequently, data may be delivered using UDP over the network at speeds well below the available bandwidth can handle, resulting in a decrease of throughout.

U.S. Pat. Nos. 6,012,159, 6,272,658, 6,336,200, 6,570,843 and 6,609,223, 7,024,609 and U.S. patent application Ser. Nos. 11/233,440, filed on Sep. 22, 2005, 11/276,225, filed on Feb. 17, 2006, 11/516,197, filed Sep. 6, 2006, and 11/874,484, filed Oct. 18, 2007, each patent and application of which is incorporated herein by reference, describe methods for applying forward error correction (FEC) to protect streams of data from outages. These methods also allow a receiver to recover data which is lost because of such outages. The techniques described in the aforementioned patents and applications can be used, for example, together with industry standards such as the standards promulgated by 3GPP2 to provide reliable communications.

BRIEF DESCRIPTION

The example embodiments described herein provide systems, methods, apparatus and computer program products for providing packet-level FEC with higher reliability as well as higher throughput using user datagram protocol (UDP).

In one embodiment, systems, methods, apparatus and computer program products provide data delivery by a server by maintaining a session counter; transmitting data to a client at a transmission speed, receiving a message from the client indicating a percentage of packets lost in a current session, and comparing the percentage of packets lost to a predefined range of packet loss.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings.

DETAILED DESCRIPTION OF THE EMBODIMENT

Generally, aspects described herein provide packet-level forward error correction (FEC) encoding from a server to one or more packet-level FEC decoding capable clients (e.g., receivers) and enables greater throughput using UDP delivery on an EV-DO network when combined with dynamic monitoring of available bandwidth. The techniques described herein apply to UDP data delivery on, for example, the Internet and IP networks. This description is not intended to limit the application of the example embodiments presented herein. In fact, after reading the following description, it will be apparent to one skilled in the relevant art(s) how to implement the following example embodiments in alternative embodiments (e.g., in systems that transmit and receive content in the form of files; in systems which perform transmission over more than two networks; non-FEC systems, non-EV-DO networks, etc.).

Figure 1:
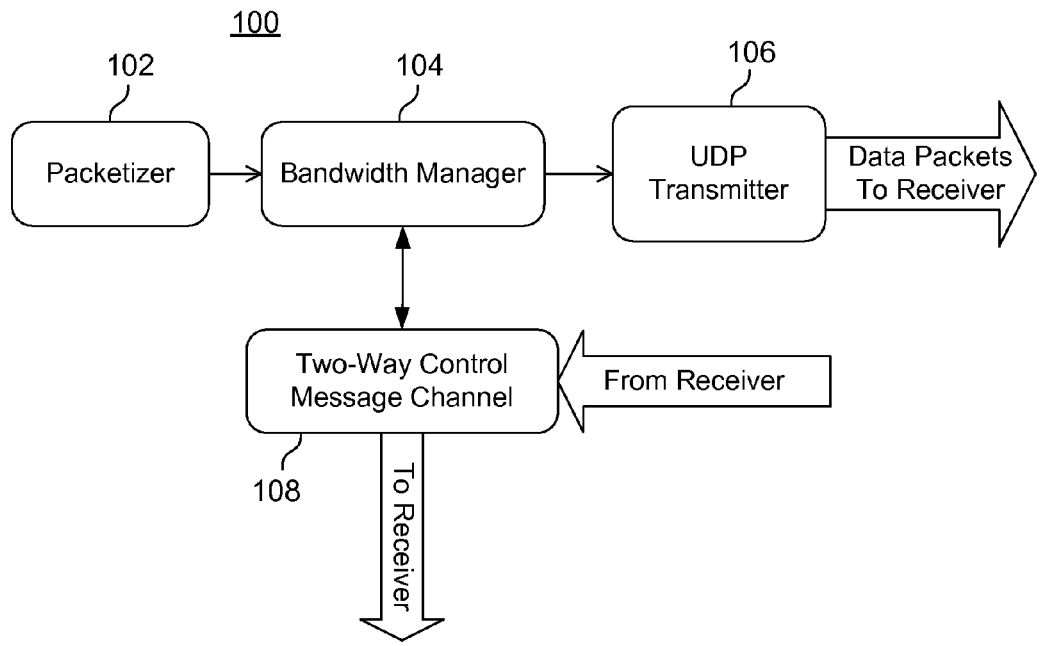
FIG. 1 depicts a diagram of a transmitter structure in accordance with an example embodiment of the present invention.

FIG. 1 is a block diagram of an exemplary transmitter 100 in accordance with an embodiment of the present invention. Transmitter 100 is also sometimes referred to as a server. Transmitter 100 includes a packetizer 102 to packetize data. Preferably the data is encoded, such as by the FEC techniques described in the above-mentioned patents and applications. Transmitter 100 also includes a bandwidth manager 104 to estimate the available network bandwidth based on a report (also referred to as a "loss ratio report") received from and including information about an active client receiver. A two-way control message channel 108 receives the report and feeds it to bandwidth manager 104. Two-way control message channel 108 communicates control messages such as the report with a two-way control message channel of the receiver described in more detail below with respect to FIG. 2. The bandwidth manager 104 adjusts the bandwidth based on the report. The packetized data is fed to a UDP transmitter 106 which in turn transmits the data packets onto a UDP transmit channel at the bandwidth set by bandwidth manager 104, as shown in FIG. 1.

Figure 2:
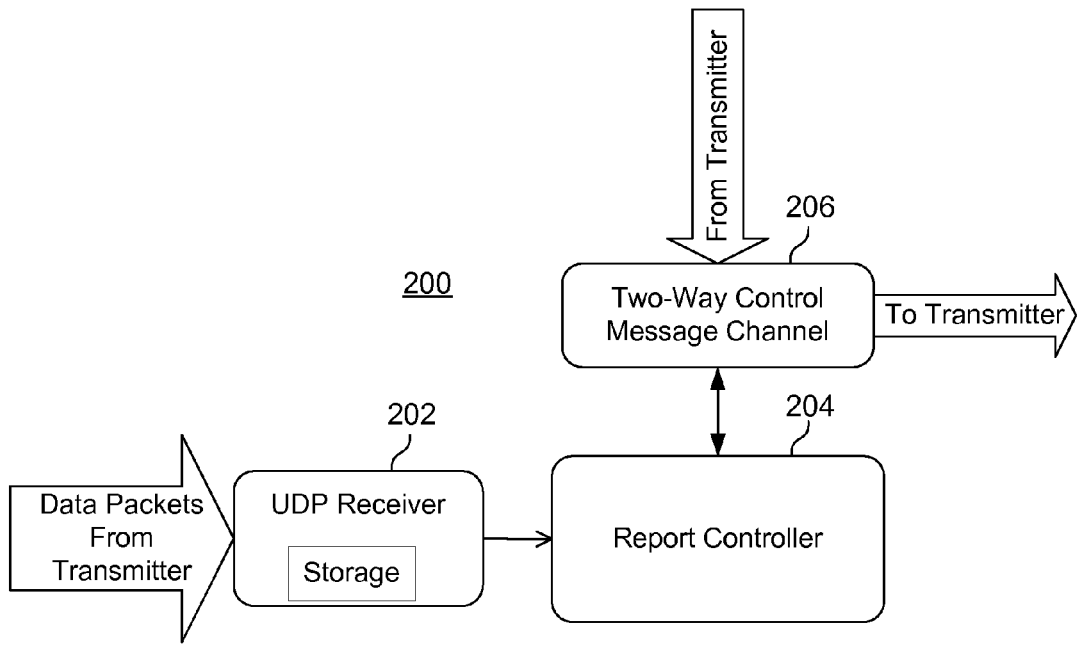
FIG. 2 depicts a receiver structure in accordance with an example embodiment of the present invention.

FIG. 2 is a block diagram of an exemplary receiver 200 in accordance with an embodiment of the present invention. As shown in FIG. 2, receiver 200 (also referred to sometimes as a "client" or "client receiver") includes a UDP packet receiver 202 to receive UDP data packets from a transmitter, such as from transmitter 100. UDP receiver 202 also includes a storage for storing the incoming data packets. A report controller 204 reads the session and sequence number for each packet and updates the status information for the receiver. At the end of each report interval, report controller 204 computes a loss ratio and sends a loss ratio report for the session to a transmitter (e.g., transmitter 100) using a two-way control message channel 206. The loss ratio report contains the largest received sequence number in the current session and the actual received packets number in the current session. The report can also include a calculated loss ratio based on these fields. Alternatively, the report can contain only the calculated loss ratio. The two-way control message channel 206 communicates the report to transmitter 100, by, for example, telephone, satellite, modem, optical, or other hard-line or wireless medium.

Figure 3:
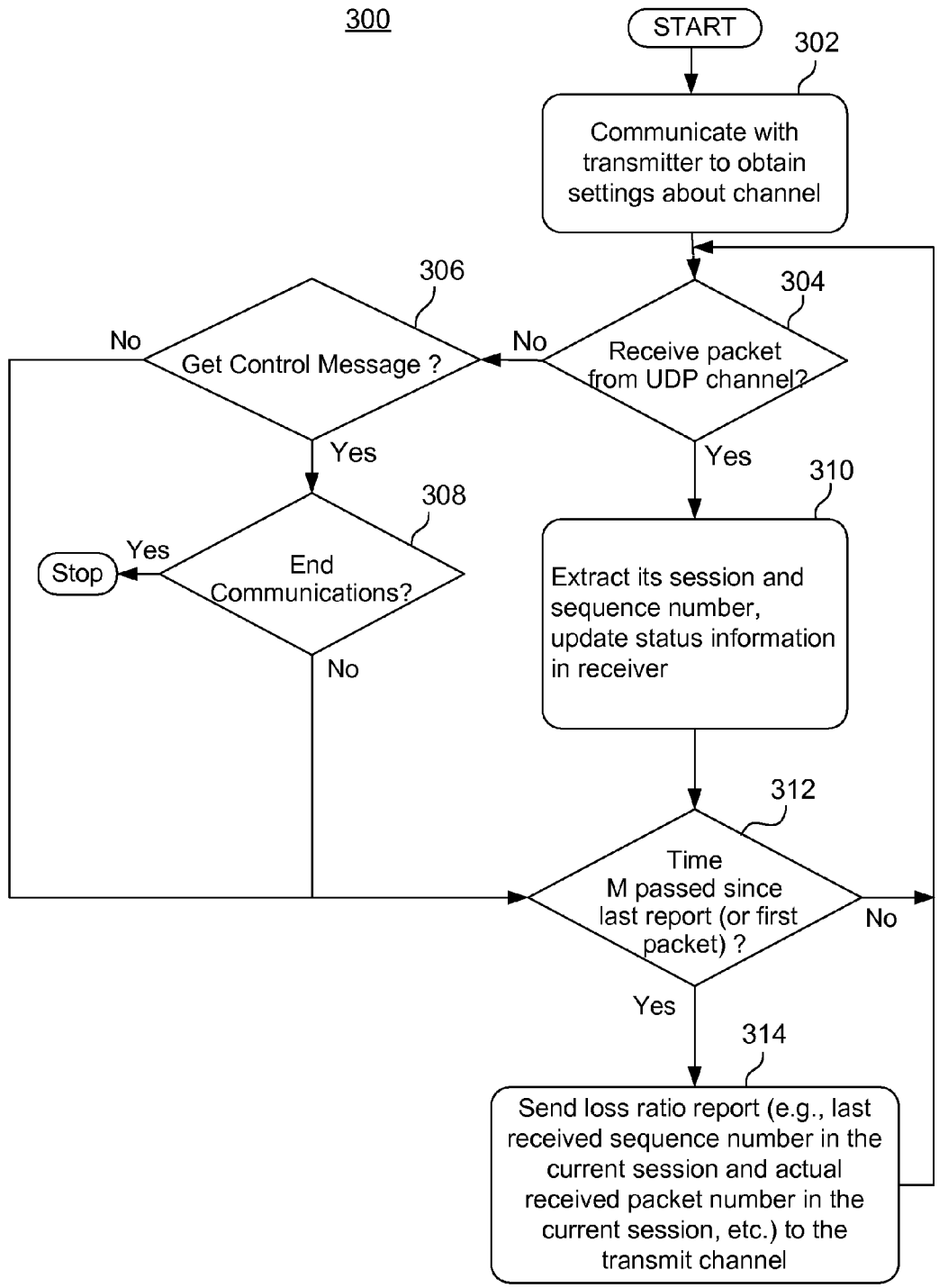
FIG. 3 is a flowchart illustrating an example receiver procedure according to one embodiment of the present invention.

FIG. 3 is a flowchart illustrating an example receiver procedure 300 according to one embodiment of the present invention. Referring also to FIG. 2, at block 302, report controller 204 communicates settings about a transmit channel with transmitter 100 through two-way control message channel 206. These settings include information about the client report interval in addition to other information such as where in the data file the last transmission was stopped. At block 304, a determination is made whether a packet has been received over a UDP transmit channel. If no UDP data packet has been received from the UDP channel, a determination is made at block 306 whether there is a control message from the control channel. For example, the message may be a message instructing the receiver that communications will or should cease as shown in block 308. If a determination is made at block 308 that the message is a cease communications message then the procedure ends. If not, or if the message did not relate to terminating communications, procedure 300 continues to block 312, which is described in more detail below.

If a determination is made at block 304 that the received packet is a UDP packet from a UDP transmit channel, then information about that packet is extracted and used to update the status of the receiver, as shown in block 310. Particularly, the packet is received from the UDP channel and its session and sequence number are extracted and used to update the receiver status information and compute a loss ratio to be communicated to a transmitter in a report.

In turn, a determination is made at block 312 whether an M second interval has passed since the last report, or, in the case of no reports having been previously sent, since the first packet was received. If time interval M has not passed then procedure 300 loops back to block 304 to check for reception of another packet from a transmitter (e.g. transmitter 100).

If a determination is made at block 312 that time interval M has passed, then at block 314 a loss ratio report, including (or based upon) the passed received sequence numbers and actual received packet number in the current session is transmitted to the transmitter and the procedure loops back to block 304 to await another packet.

Figure 4:
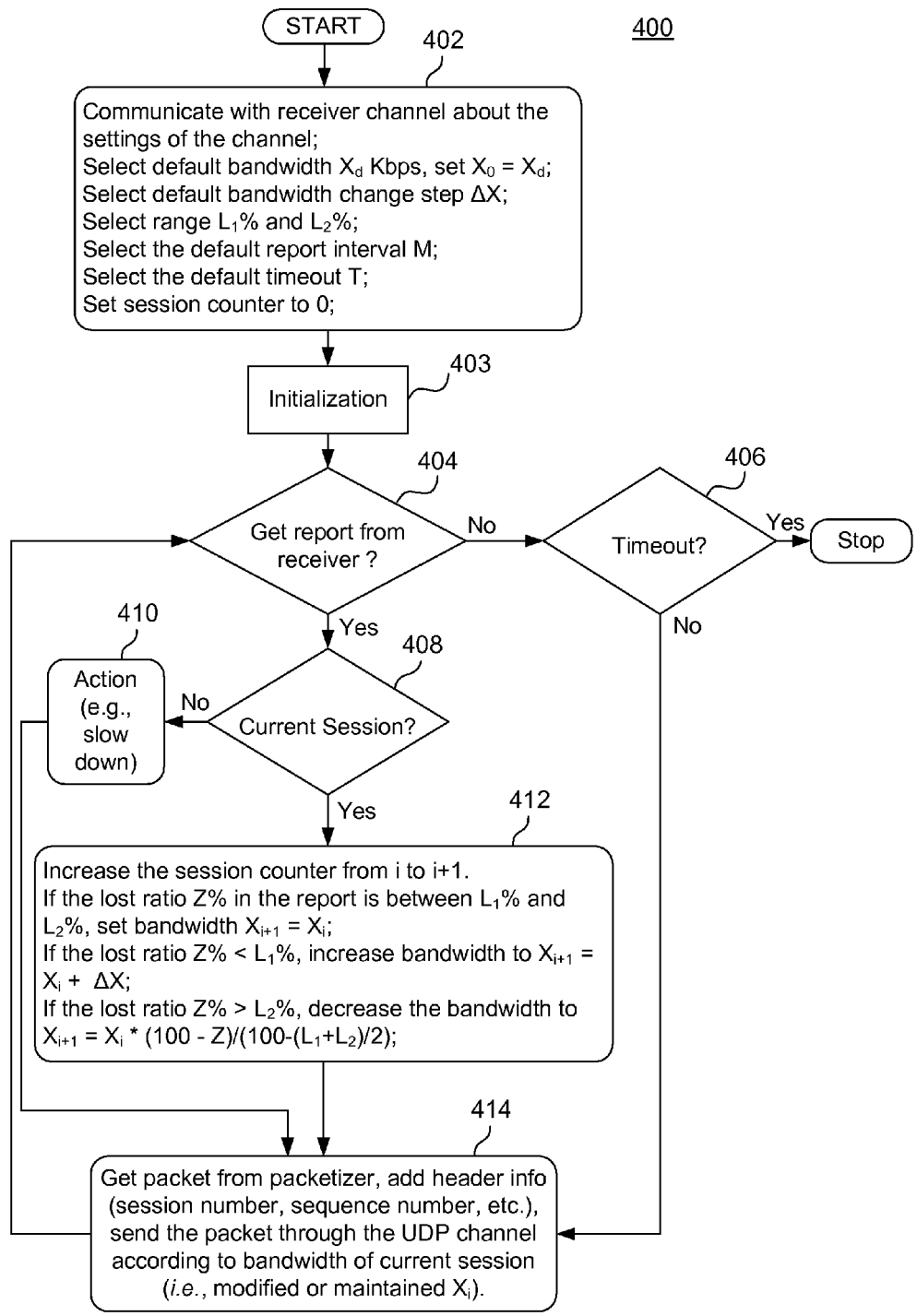
FIG. 4 is a flowchart illustrating an example transmitter procedure according to one embodiment of the present invention.

FIG. 4 is a flowchart illustrating a transmitter procedure 400 according to one embodiment of the present invention. Referring also to FIG. 1, procedure 400 causes data to be delivered as follows. At step 402, server 100 selects (1) a default transmission speed of $X_d$ Kbps (i.e., sets $X_0=X_d$), (2) a default change in transmission speed of $\Delta X$ Kbps (also referred to as a "change step"), (3) a predefined data loss ratio range ($L_1\%$ and $L_2\%$), and (4) an M second feedback interval. Server 100 also sets a session counter to 0, as shown in step 402. Optionally, a default timeout interval "T" can be set, which also is shown in block 402. In addition, server 100 communicates with client 200 about the settings of the channel parameters.

In block 403, packetizer 102 is initialized. For example, transmission can be with or without FEC encoding. If FEC is used, packetizer 102 can be initialized to perform the encoding techniques described in the aforementioned patents and patent applications.

At block 404 a determination is made whether a report has been received from receiver 200 (via two-way control message channels FIG. 1, 108, FIG. 2, 206). If a report has not been received, then at block 406 a determination is made whether the timeout interval T has been reached. If so, this means no report has been received for an interval T and the procedure ends. If the time interval T has not been reached, then at block 414 a packet is retrieved from the packetizer, encapsulated with header information such as session number, sequence number, and other conventional header information such a timestamp, and transmitted from UDP transmitter 106 through a UDP transmit channel at $X_i$ Kbps, which in the initial scenario is the default bandwidth $X_d$.

As described in more detail below, after the default report interval of M seconds, the client 200 sends back to the server a short message (typically in a single packet) that indicates the Z percentage of packets lost in the current session. The Z percentage of packets lost information received from client 200 is compared against the range from $L_1$ to $L_2$, which are low and high limits, respectively. As shown in block 412, the bandwidth, is increased, decreased or kept the same based on the results of the comparison. In general, the increased or decreased transmission speed is the transmission speed adjusted by a transmission speed change amount which is based on feedback information from the client.

Referring to block 412, if $L_1 <= Z <= L_2$, then transmitter 100 keeps the current transmission speed $X_i$ the same and increments the session counter.

The report also includes a corresponding session identifier that can be used by server 100 to determine if the it is for an old, expired, session. If a determination is made at block 408 that the report is not for the current session, then at block 410 an action is taken on the received information. For example, the report may be old, causing the transmitter 100 to slow down its bandwidth (i.e., decrease $X_i$). Next at block 414, the server retrieves the packet from the packetizer FIG. 1, 102, encapsulates it with header information and transmits it at the lower $X_i$ Kbps.

If $Z<L_1$, then the server increases the transmission speed to $X_{i+1}$ by the following formula:

$$X_{i+1}=X_i+\Delta X \tag{1}$$

and increments the session counter. The server then sends data from the data file at the increased transmission speed, as shown in block 412. If $Z>L_2$, then the server lowers the transmission speed proportionally to $X_{i+1}$, so that if $X_{i+1}$ had been used instead of $X_i$ in the current session, the packet loss percentage Z would have been within the $L_1$ and $L_2$ percentage range. The server then increments the session counter and transmitter 100 sends data from the data file at the lower transmission speed as shown in block 414. The formula used to compute $X_{i+1}$ in this case is:

$$X_{i+1}=X_i*(100-Z)/(100-(L_1+L_2)/2) \tag{2}$$

If a client message indicates that the file reception has been completed or that the client is leaving, the server stops transmitting data. For example if a determination is made at block 404 that a report has not been received, then the server may stop transmitting data if it has not received a client message for a predefined time interval, as shown in block 406. Otherwise, process 400 continues until the transmission of the data file has been completed. This method is automated by the interaction between the server program and the client program. That is, the method operates at the application level on top of the network.

If a server is used and user turns off the client, the server will stop transmitting. When the user turns the client back on, the server will resume transmitting the data and the client will resume receiving and building the data file where it left off. This feature is very useful, for example, for sending large files to a mobile user, whose receive device may be intermittently accessible, in the least amount of time possible.

The example embodiments of the invention (i.e., systems 100-200, and the processes described above, or any part(s) or function(s) thereof) may be implemented using hardware, software or a combination thereof and may be implemented in one or more computer systems or other processing systems. Useful machines for performing the operation of the example embodiments presented herein include general purpose digital computers or similar devices.

From a hardware standpoint, the transmitter and receiver systems described above typically include one or more components, such as one or more microprocessors, for performing the arithmetic and/or logical operations required for program execution, and storage media, such as one or more disk drives or memory cards (e.g., flash memory) for program and data storage, and random access memory, for temporary data and program instruction storage. From a software standpoint, a processor typically includes software resident on a storage media (e.g., a disk drive or memory card), which, when executed, directs the processor in performing transmission and reception functions. The processor software may run on an operating system stored on the storage media, such as, for example, UNIX or Windows (e.g., NT, XP, Vista), Linux, and the like, and can adhere to various protocols. As is well known in the art, processors can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

The transmitter and receiver systems described above may include plural separate processors, where each is dedicated to a separate application, such as, for example, a data application, a voice application, and a video application.

Software embodiments of the example embodiments presented herein may be provided as a computer program product, or software, that may include an article of manufacture on a machine-accessible or machine-readable medium having instructions. The instructions on the machine-accessible or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine-accessible medium" or "machine-readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-4 are presented for example purposes only. The architecture and processes of the example embodiments presented herein are sufficiently flexible and configurable, such that they may be utilized in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the processes recited in the claims need not be performed in the order presented.

What is claimed is:

1. A method for data delivery by a server, comprising the steps of:
    maintaining a session counter set by the server, the session counter being used by a client to identify packets of a current UDP session and determine a percentage of packets lost in the current UDP session;
    transmitting data including the session counter to the client at a transmission speed;
    receiving a message from the client indicating the percentage of packets lost in the current UDP session;
    comparing the percentage of packets lost to a predefined range of packet loss; and
    increasing, decreasing or maintaining the transmission speed of the current UDP session based on the comparing,
    wherein at least one of the above steps is performed by a processor.

2. The method according to claim 1, further comprising the step of:
    incrementing the session counter and transmitting additional data at the transmission speed when the percentage of packets lost is within the predefined range.

3. The method according to claim 1, further comprising the step of: increasing the transmission speed to an increased transmission speed, incrementing the session counter and transmitting additional data at the increased transmission speed when the percentage of packets lost is less than the predefined range.

4. The method according to claim 3, wherein the increased transmission speed is the transmission speed plus a transmission speed change amount based on feedback information from the client.

5. The method according to claim 1,
decreasing the transmission speed to a decreased transmission speed, incrementing the session counter and transmitting additional data at the decreased transmission speed when the percentage of packets lost is greater than the predefined range.

6. The method according to claim 5, wherein the decreased transmission speed is decreased proportionally based on the percentage of packets lost.

7. The method according to claim 1, further comprising the step of:
receiving from the client a termination request message; and
terminating transmission of data based on the termination request message.

8. The method according to claim 7, wherein the termination request message identifies a reason for terminating transmission.

9. The method according to claim 1,
terminating the transmission when the server has not received the message from the client before a predefined time interval.

10. A server for delivering data to a client, comprising:
a session counter, the session counter being used by a client to identify packets of a current UDP session and determine a percentage of packets lost in the current UDP session;
a transmitter operable to transmit data including the session counter to the client at a transmission speed;
a receiver operable to receive a message from the client indicating a percentage of packets lost in the current UDP session;
a comparator operable to compare the percentage of packets lost to a predefined range of packet loss; and
a processor operable to control the transmitter to increase, decrease or maintain the transmission speed of the current UDP session based on the comparing.

11. The server according to claim 10, wherein:
the session counter is further operable to be incremented and the transmitter is further operable to transmit additional data at the transmission speed, when the percentage of packets lost is within the predefined range.

12. The server according to claim 10, wherein:
the session counter is further operable to be incremented and the transmitter is further operable to increase the transmission speed to an increased transmission speed and transmit additional data at the increased transmission speed, when the percentage of packets lost is less than the predefined range.

13. The server according to claim 12, wherein the increased transmission speed is the transmission speed plus a transmission speed change amount based on feedback information from the client.

14. The server according to claim 10, wherein:
the session counter is further operable to be incremented and the transmitter is further operable to decrease the transmission speed to a decreased transmission speed and transmit additional data at the decreased transmission speed, when the percentage of packets lost is greater than the predefined range.

15. The server according to claim 14, wherein the decreased transmission speed is decreased proportionally based on the percentage of packets lost.

16. The server according to claim 10, wherein the transmitter is further operable to receive from the client a termination request message and the transmitter is further operable to terminate transmission of data based on the termination request message.

17. The server according to claim 16, wherein the termination request message identifies a reason for terminating transmission.

18. The server according to claim 10, wherein:
the transmitter is further operable to terminate the transmission when the server has not received the message from the client before a predefined time interval.

19. A non-transitory computer-readable medium for storing instructions which when executed by a processor, cause the processor to perform the steps of:
maintaining a session counter set by the server, the session counter being used by a client to identify packets of a current UDP session and determine a percentage of packets lost in the current UDP session;
transmitting data including the session counter to the client at a transmission speed;
receiving a message from the client indicating a percentage of packets lost in the current UDP session;
comparing the percentage of packets lost to a predefined range of packet loss; and
at least one of increasing, decreasing or maintaining the transmission speed of the predetermined communication session based on the comparing.

* * * * *

UNITED STATES PATENT AND TRADEMARK OFFICE
CERTIFICATE OF CORRECTION

| | |
|---|---|
| PATENT NO. | : 7,949,778 B2 |
| APPLICATION NO. | : 12/055553 |
| DATED | : May 24, 2011 |
| INVENTOR(S) | : Weimin Fang |

It is certified that error appears in the above-identified patent and that said Letters Patent is hereby corrected as shown below:

COLUMN 1:

Line 48, "below" should read --below what--;
Line 50, "6,570,843" should read --6,570,843,--; and
Line 51, "and" (first occurrence) should be deleted.

COLUMN 2:

Line 38, "enables" should read --enable--.

COLUMN 4:

Line 44, "the" should be deleted.

Signed and Sealed this
Twenty-eighth Day of February, 2012

David J. Kappos
*Director of the United States Patent and Trademark Office*